United States Patent
Mueller et al.

(10) Patent No.: US 10,981,108 B2
(45) Date of Patent: Apr. 20, 2021

(54) MOISTURE SEPARATION SYSTEMS FOR DOWNHOLE DRILLING SYSTEMS

(71) Applicants: Stephan Mueller, Lauenau (DE); Brian Ochoa, Hannover (DE)

(72) Inventors: Stephan Mueller, Lauenau (DE); Brian Ochoa, Hannover (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 165 days.

(21) Appl. No.: 16/125,963

(22) Filed: Sep. 10, 2018

(65) Prior Publication Data

US 2019/0083928 A1     Mar. 21, 2019

Related U.S. Application Data

(60) Provisional application No. 62/558,912, filed on Sep. 15, 2017.

(51) Int. Cl.
*B01D 53/26*    (2006.01)
*B01D 5/00*    (2006.01)
*E21B 21/06*    (2006.01)
*E21B 49/08*    (2006.01)

(52) U.S. Cl.
CPC ......... *B01D 53/265* (2013.01); *B01D 5/0006* (2013.01); *E21B 21/067* (2013.01); *E21B 49/086* (2013.01)

(58) Field of Classification Search
CPC .... B01D 53/265; B01D 5/0006; E21B 21/067
See application file for complete search history.

(56) References Cited

U.S. PATENT DOCUMENTS

| | | | |
|---|---|---|---|
| 2,694,923 A | | 11/1954 | Carpenter |
| 2,970,669 A | * | 2/1961 | Bergson ............... B01D 5/0072 |
| | | | 96/139 |
| 3,100,697 A | | 8/1963 | Hull |
| 3,788,389 A | | 1/1974 | Waters |

(Continued)

FOREIGN PATENT DOCUMENTS

| | | |
|---|---|---|
| GB | 2446472 A | 8/2008 |
| JP | 10113526 A | 5/1998 |

(Continued)

OTHER PUBLICATIONS

International Search Report, International Application No. PCT/US2018/050811, dated Jan. 4, 2019, Korean Intellectual Property Office; International Search Report 4 pages.

(Continued)

*Primary Examiner* — Jonathan Miller
(74) *Attorney, Agent, or Firm* — Cantor Colburn LLP

(57) ABSTRACT

Moisture separation systems and condensation devices for gas extracted from drilling fluids while drilling are provided. The condensation devices include a body having a first end and a second end and an exterior wall defining an interior surface, an interior passage providing a connection from the first end to the second end, and an angled support path within the interior passage, the angled support path extending from the interior surface and angled with respect to gravity. The angled support path is configured to direct a condensate away from the interior surface by the operation of gravity.

21 Claims, 8 Drawing Sheets

(56) References Cited

U.S. PATENT DOCUMENTS

| | | | |
|---|---|---|---|
| 3,837,396 A * | 9/1974 | Newton | F25B 39/04 |
| | | | 165/111 |
| 3,852,804 A | 12/1974 | Walmet et al. | |
| 4,026,120 A | 5/1977 | Tallant | |
| 4,129,180 A | 12/1978 | Larinoff | |
| 4,213,770 A | 7/1980 | Schaefer | |
| 4,233,812 A | 11/1980 | Leistritz | |
| 4,319,482 A | 3/1982 | Bunner | |
| 4,431,069 A | 2/1984 | Dickinson et al. | |
| 4,640,347 A | 2/1987 | Grover et al. | |
| 4,867,231 A | 9/1989 | Bottum | |
| 5,230,166 A * | 7/1993 | Deng | B01D 5/0039 |
| | | | 165/111 |
| 5,803,161 A | 9/1998 | Wahle et al. | |
| 6,179,594 B1 | 1/2001 | Woodcock | |
| 6,589,322 B2 * | 7/2003 | D'Eletto | B01D 45/02 |
| | | | 55/320 |
| 6,769,487 B2 | 8/2004 | Hache | |
| 7,314,089 B2 | 1/2008 | Howard et al. | |
| 7,347,059 B2 | 3/2008 | Kidwell et al. | |
| 7,819,205 B2 | 10/2010 | Tobben et al. | |
| 7,867,399 B2 | 1/2011 | Jones et al. | |
| 8,002,712 B2 | 8/2011 | Meka et al. | |
| 8,061,135 B2 | 11/2011 | Rutherford et al. | |
| 8,196,422 B2 * | 6/2012 | Ritchey | B01D 5/0006 |
| | | | 62/235.1 |
| 8,561,673 B2 | 10/2013 | Schuette | |
| 8,657,926 B2 | 2/2014 | Mielke et al. | |
| 9,004,195 B2 | 4/2015 | Regener et al. | |
| 9,291,401 B2 | 3/2016 | Veitch | |
| 9,353,621 B2 | 5/2016 | Schexnaider | |
| 9,383,093 B2 | 7/2016 | Tilmont et al. | |
| 9,415,335 B2 * | 8/2016 | Huff | F25B 1/10 |
| 9,598,946 B2 | 3/2017 | Shomody et al. | |
| 2005/0103615 A1 * | 5/2005 | Ritchey | B01D 5/0039 |
| | | | 203/10 |
| 2006/0202122 A1 * | 9/2006 | Gunn | E21B 21/01 |
| | | | 250/339.13 |
| 2009/0260586 A1 | 10/2009 | Geskes et al. | |
| 2010/0101793 A1 | 4/2010 | Symington et al. | |
| 2012/0145362 A1 | 6/2012 | Harrington | |
| 2013/0167530 A1 | 7/2013 | Hsieh et al. | |
| 2014/0060779 A1 * | 3/2014 | Karandikar | H02B 1/56 |
| | | | 165/104.21 |
| 2014/0110087 A1 | 4/2014 | Chen et al. | |
| 2016/0096122 A1 | 4/2016 | Smith et al. | |
| 2019/0083928 A1 * | 3/2019 | Mueller | E21B 21/067 |

FOREIGN PATENT DOCUMENTS

| | | |
|---|---|---|
| JP | 2011257060 A | 12/2011 |
| KR | 1020120122883 A | 11/2012 |
| WO | 2011073952 A2 | 6/2011 |
| WO | 2016134845 A1 | 9/2016 |

OTHER PUBLICATIONS

International Written Opinion, International Application No. PCT/US2018/050811, dated Jan. 4, 2019, Korean Intellectual Property Office; International Written Opinion 6 pages.

* cited by examiner

MOISTURE SEPARATION SYSTEMS FOR DOWNHOLE DRILLING SYSTEMS

CROSS REFERENCE TO RELATED APPLICATIONS

This application claims the benefit of an earlier filing date from U.S. Provisional Application Ser. No. 62/558,912, filed Sep. 15, 2017, the entire disclosure of which is incorporated herein by reference.

BACKGROUND

1. Field of the Invention

The present invention generally relates to drilling systems and more particularly to moisture separation systems for use with drilling systems.

2. Description of the Related Art

Boreholes are drilled deep into the earth for many applications such as carbon dioxide sequestration, geothermal production, and hydrocarbon exploration and production. In all of the applications, the boreholes are drilled such that they pass through or allow access to a material (e.g., a gas or fluid) contained in a formation located below the earth's surface. Different types of tools and instruments may be disposed in the boreholes to perform various tasks and measurements.

While drilling into and through earth formations, drilling fluid is continuously used to drive and operate a drilling tool. The drilling fluid is typically, continuously probed with regards to gases coming out of the drilled borehole. Such monitoring and probing of the gases is part of typical surface logging services. Surface logging services can include separating a flow from the drilling mud that is flowing out of the borehole (e.g., at the surface). The separated flow of drilling mud can be heated to specific temperature(s) to enable specific monitoring processes. Once heated, gas can be extracted from the separated drilling mud flow with a high and relatively constant extraction efficiency. The extraction efficiency can be determined so that a quantitative determination of the gas content is possible. The gas can be continuously extracted using a gas extraction unit, with the gas being transferred to a gas analysis unit. As such, an opening in a gas extraction unit is used to add air or another defined gas in a percentage depending on a present amount of extracted gas. Usually the gas is dried in the gas analysis unit (or other associated structure/unit/device) before gas analysis is performed. A hose or tubing (hereinafter called a "ditch line") connects the gas extraction unit to the gas analysis unit, which may be exposed to environmental temperatures (e.g., ambient temperatures).

Depending on the extraction temperature and the environmental temperature, condensation may occur inside the ditch line. The condensate can significantly increase a pressure drop in the ditch line and lead to an unstable flow. In addition, the condensate may corrupt measurements of the extracted gas such as measurements with a gas chromatograph. Typical solutions involve the installation of a heated line that provides thermal control of the extracted gas in the ditch line in order to dry the extracted gas.

SUMMARY

Moisture separation systems and condensation devices for gas extracted from drilling fluids while drilling are provided. The condensation devices include a body having a first end and a second end and an exterior wall defining an interior surface, an interior passage providing a connection from the first end to the second end, and an angled support path within the interior passage, the angled support path extending from the interior surface and angled with respect to gravity. The angled support path is configured to direct a condensate away from the interior surface by the operation of gravity.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

Figure 1:
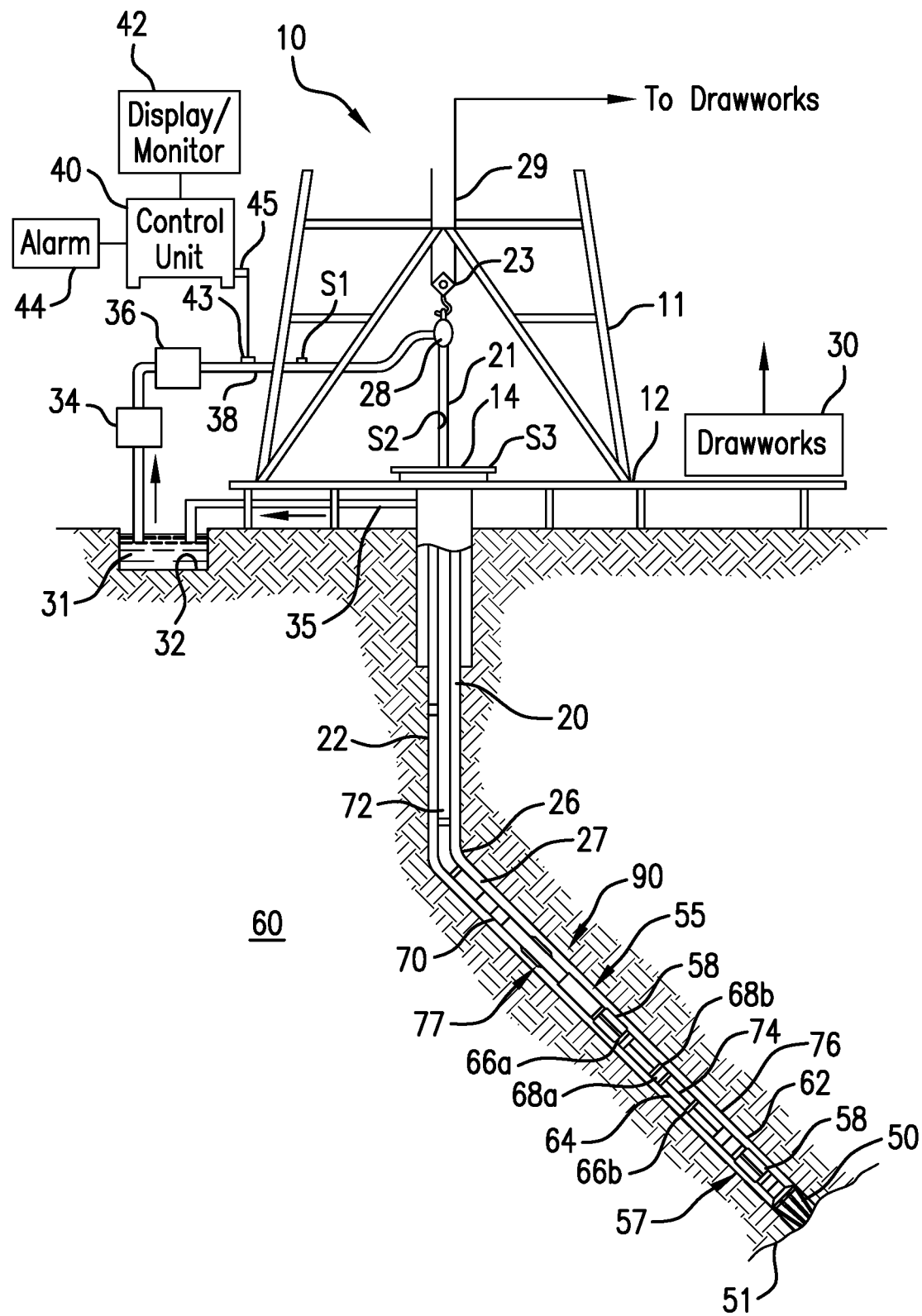
FIG. 1 is an example of a system for performing downhole operations that can employ embodiments of the present disclosure.

FIG. 1 shows a schematic diagram of a system for performing downhole operations. As shown, the system is a drilling system 10 that includes a drill string 20 having a drilling assembly 90, also referred to as a bottomhole assembly (BHA), conveyed in a borehole 26 penetrating an earth formation 60. The drilling system 10 includes a conventional derrick 11 erected on a floor 12 that supports a rotary table 14 that is rotated by a prime mover, such as an electric motor (not shown), at a desired rotational speed. The drill string 20 includes a drill pip 22, or drilling tubular, extending downward from the rotary table 14 into the borehole 26. A disintegrating tool 50, such as a drill bit attached to the end of the BHA 90, disintegrates the geological formations when it is rotated to drill the borehole 26. The drill string 20 is coupled to surface equipment such as systems for lifting, rotating, and/or pushing, including, but not limited to, a drawworks 30 via a kelly joint 21, swivel 28 and line 29 through a pulley 23. In some embodiments, the surface equipment may include a top drive (not shown). During the drilling operations, the drawworks 30 is operated to control the weight on bit, which affects the rate of penetration. The operation of the drawworks 30 is well known in the art and is thus not described in detail herein.

During drilling operations a suitable drilling fluid 31 (also referred to as the "mud") from a source or mud pit 32 is circulated under pressure through the drill string 20 by a mud pump 34. The drilling fluid 31 passes into the drill string 20 via a desurger 36, fluid line 38 and the kelly joint 21. The drilling fluid 31 is discharged at the borehole bottom 51 through an opening in the disintegrating tool 50. The drilling fluid 31 circulates uphole through the annular space 27 between the drill string 20 and the borehole 26 and returns to the mud pit 32 via a return line 35. A sensor S1 in the fluid line 38 provides information about the fluid flow rate. A surface torque sensor S2 and a sensor S3 associated with the drill string 20 respectively provide information about the torque and the rotational speed of the drill string. Additionally, one or more sensors (not shown) associated with line 29 are used to provide the hook load of the drill string 20 and about other desired parameters relating to the drilling of the borehole 26. The system may further include one or more downhole sensors 70 located on the drill string 20 and/or the BHA 90.

In some applications the disintegrating tool 50 is rotated by only rotating the drill pipe 22. However, in other applications, a drilling motor 55 (mud motor) disposed in the drilling assembly 90 is used to rotate the disintegrating tool 50 and/or to superimpose or supplement the rotation of the drill string 20. In either case, the rate of penetration (ROP) of the disintegrating tool 50 into the borehole 26 for a given formation and a drilling assembly largely depends upon the weight on bit and the drill bit rotational speed. In one aspect of the embodiment of FIG. 1, the mud motor 55 is coupled to the disintegrating tool 50 via a drive shaft (not shown) disposed in a bearing assembly 57. The mud motor 55 rotates the disintegrating tool 50 when the drilling fluid 31 passes through the mud motor 55 under pressure. The bearing assembly 57 supports the radial and axial forces of the disintegrating tool 50, the downthrust of the drilling motor and the reactive upward loading from the applied weight on bit. Stabilizers 58 coupled to the bearing assembly 57 and other suitable locations act as centralizers for the lowermost portion of the mud motor assembly and other such suitable locations.

A surface control unit 40 receives signals from the downhole sensors 70 and devices via a transducer 43, such as a pressure transducer, placed in the fluid line 38 as well as from sensors 51, S2, S3, hook load sensors, RPM sensors, torque sensors, and any other sensors used in the system and processes such signals according to programmed instructions provided to the surface control unit 40. The surface control unit 40 displays desired drilling parameters and other information on a display/monitor 42 for use by an operator at the rig site to control the drilling operations. The surface control unit 40 contains a computer, memory for storing data, computer programs, models and algorithms accessible to a processor in the computer, a recorder, such as tape unit, memory unit, etc. for recording data and other peripherals. The surface control unit 40 also may include simulation models for use by the computer to processes data according to programmed instructions. The control unit responds to user commands entered through a suitable device, such as a keyboard. The control unit 40 is adapted to activate alarms 44 when certain unsafe or undesirable operating conditions occur.

The drilling assembly 90 also contains other sensors and devices or tools for providing a variety of measurements relating to the formation surrounding the borehole and for drilling the borehole 26 along a desired path. Such devices may include a device for measuring the formation resistivity near and/or in front of the drill bit, a gamma ray device for measuring the formation gamma ray intensity and devices for determining the inclination, azimuth and position of the drill string. A formation resistivity tool 64, made according an embodiment described herein may be coupled at any suitable location, including above a lower kick-off subassembly 62, for estimating or determining the resistivity of the formation near or in front of the disintegrating tool 50 or at other suitable locations. An inclinometer 74 and a gamma ray device 76 may be suitably placed for respectively determining the inclination of the BHA and the formation gamma ray intensity. Any suitable inclinometer and gamma ray device may be utilized. In addition, an azimuth device (not shown), such as a magnetometer or a gyroscopic device, may be utilized to determine the drill string azimuth. Such devices are known in the art and therefore are not described in detail herein. In the above-described exemplary configuration, the mud motor 55 transfers power to the disintegrating tool 50 via a hollow shaft that also enables the drilling fluid to pass from the mud motor 55 to the disintegrating tool 50. In an alternative embodiment of the drill string 20, the mud motor 55 may be coupled below the formation resistivity tool 64 or at any other suitable place.

Still referring to FIG. 1, other logging-while-drilling (LWD) devices (generally denoted herein by numeral 77), such as devices for measuring formation porosity, permeability, density, rock properties, fluid properties, etc. may be placed at suitable locations in the drilling assembly 90 for providing information useful for evaluating the subsurface formations along borehole 26. Such devices may include, but are not limited to, temperature measurement tools, pressure measurement tools, borehole diameter measuring tools (e.g., a caliper), acoustic tools, nuclear tools, nuclear magnetic resonance tools and formation testing and sampling tools.

The above-noted devices transmit data to a downhole telemetry system 72, which in turn transmits the received data uphole to the surface control unit 40. The downhole telemetry system 72 also receives signals and data from the surface control unit 40 including a transmitter and transmits such received signals and data to the appropriate downhole devices. In one aspect, a mud pulse telemetry system may be used to communicate data between the downhole sensors 70 and devices and the surface equipment during drilling operations. A transducer 43 placed in the fluid line 38 (e.g., mud supply) detects the mud pulses responsive to the data transmitted by the downhole telemetry 72. Transducer 43 generates electrical signals in response to the mud pressure variations and transmits such signals via a conductor 45 to the surface control unit 40. In other aspects, any other suitable telemetry system may be used for two-way data communication (e.g., downlink and uplink) between the surface and the BHA 90, including but not limited to, an acoustic telemetry system, an electro-magnetic telemetry system, an optical telemetry system, a wired pipe telemetry system which may utilize wireless couplers or repeaters in the drill string or the borehole. The wired pipe may be made up by joining drill pipe sections, wherein each pipe section includes a data communication link that runs along the pipe. The data connection between the pipe sections may be made by any suitable method, including but not limited to, hard electrical or optical connections, induction, capacitive, resonant coupling, or directional coupling methods. In case a coiled-tubing is used as the drill pipe 22, the data communication link may be run along a side of the coiled-tubing.

The drilling system described thus far relates to those drilling systems that utilize a drill pipe to conveying the drilling assembly 90 into the borehole 26, wherein the weight on bit is controlled from the surface, typically by controlling the operation of the drawworks. However, a large number of the current drilling systems, especially for drilling highly deviated and horizontal boreholes, utilize coiled-tubing for conveying the drilling assembly downhole. In such application a thruster is sometimes deployed in the drill string to provide the desired force on the drill bit. Also, when coiled-tubing is utilized, the tubing is not rotated by a rotary table but instead it is injected into the borehole by a suitable injector while the downhole motor, such as mud motor 55, rotates the disintegrating tool 50. For offshore drilling, an offshore rig or a vessel is used to support the drilling equipment, including the drill string.

Still referring to FIG. 1, a formation resistivity tool 64 may be provided that includes, for example, a plurality of antennas including, for example, transmitters 66a or 66b and/or receivers 68a or 68b. Resistivity can be one formation property that is of interest in making drilling decisions. Those of skill in the art will appreciate that other formation property tools can be employed with or in place of the formation resistivity tool 64.

Liner drilling can be one configuration or operation used for providing a disintegrating device becomes more and more attractive in the oil and gas industry as it has several advantages compared to conventional drilling. One example of such configuration is shown and described in commonly owned U.S. Pat. No. 9,004,195, entitled "Apparatus and Method for Drilling a Borehole, Setting a Liner and Cementing the Borehole During a Single Trip," which is incorporated herein by reference in its entirety. Importantly, despite a relatively low rate of penetration, the time of getting the liner to target is reduced because the liner is run in-hole while drilling the borehole simultaneously. This may be beneficial in swelling formations where a contraction of the drilled well can hinder an installation of the liner later on. Furthermore, drilling with liner in depleted and unstable reservoirs minimizes the risk that the pipe or drill string will get stuck due to hole collapse.

Although FIG. 1 is shown and described with respect to a drilling operation, those of skill in the art will appreciate that similar configurations, albeit with different components, can be used for performing different downhole operations. For example, wireline, coiled tubing, and/or other configurations can be used as known in the art. Further, production configurations can be employed for extracting and/or injecting materials from/into earth formations. Thus, the present disclosure is not to be limited to drilling operations but can be employed for any appropriate or desired downhole operation(s).

There is a demand for apparatuses and/or devices to collect gases emitted from and/or actively extracted from fluid and slurry materials that are generated and used during drilling operations. For example, gases may be entrained in a return flow material (e.g., drilling mud) discharged from an oil or gas exploration well. This return flow material is generally in the form of a mud stream. Collection, extraction, and analysis of drilling mud gases can be used to indicate the hydrocarbon content in the borehole which can provide a basis for an assessment of the downhole earth formation and/or any indications that the drilling operation has reached a producing/production zone. In a non-limiting example, in an oil-and-gas well, generally the primary hydrocarbon gas of interest is methane gas. Thus, information relating to the methane gas content of a well return-flow material is the information that is usually of most interest. Further, under certain drilling conditions or for other reasons, there may be an interest in information relating to some of the other hydrocarbons and/or gases that may be present in the well return-flow material. The gases obtained from the return-flow material discharged from the oil or gas exploration well are sampled for analysis. Humidity within the extracted gas may be undesirable, and thus mechanisms for drying the extracted gas to remove any humidity and/or certain contaminates is desirable.

Embodiments of the present disclosure are directed to condensation devices and/or units to be employed upstream of a ditch line to extract moisture from gas that is to be analyzed by a gas analysis unit. As noted, depending on an extraction temperature and environmental temperatures, condensation may occur inside the ditch line. The condensate can significantly increase the pressure drop in the line and lead to an unstable flow. Instead of installing an expensive heated line that provides temperature control of gas in the ditch line (or other line, tube, or hose associated with the extraction of gas from drilling mud), a condensation device as described herein can be employed. Condensation devices as provided herein are arranged to cool drilling mud extracted gas using environmental air temperatures prior to passing the gas through a ditch line. In some embodiments, condensate is directed back to an extraction unit by gravity. The advantage of these embodiments is that there is no pump or other external energy source required. This is of special interest as the extraction device is typically placed in an area of potentially explosive atmosphere.

Accordingly, condensation devices of the present disclosure are located between a gas extraction unit and a ditch line, with the ditch line supplying gas to a gas analysis unit. The gas analysis unit may be at any distance to the condensation device. In particular, the gas analysis unit may be out of the area of potentially explosive atmosphere. The pre-cooling provided by condensation devices of the present disclosure can cause a condensation rate in a ditch line to be reduced to a minimum. Embodiments of the present disclosure are directed to separation of condensate flow from gas flow prior to supplying the gas flow into a ditch line and/or gas analysis unit. In accordance with some embodiments, condensation device has an increased efficiency due to a reduced area with condensate film. The condensate device is to be used above a gas extractor and does not require external energy. In this context, "above" is meant to include at some vertical distance irrespective of the horizontal distance. Hence, "above" means at any location with a higher gravity potential. The reduced condensate film area is achieved by a helical inward angled shape of the fluid path inside the condensation devices (e.g., by a helical shape of the fluid path that is angled toward the center of the condensation device).

Figure 2:
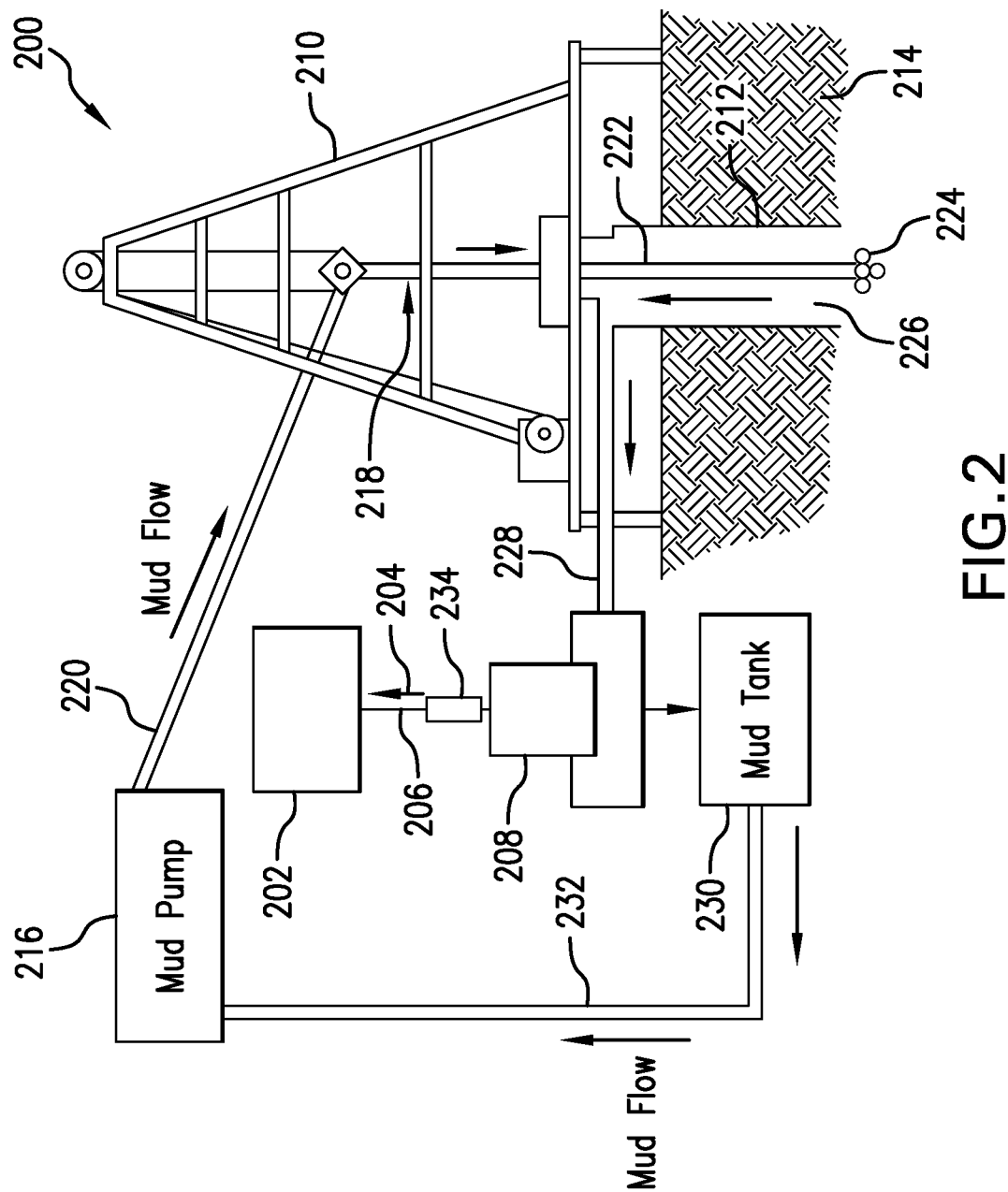
FIG. 2 is a schematic illustration of a system according to an embodiment of the present disclosure.

As shown in FIG. 2, a schematic illustration of a surface drilling mud gas analysis system 200 in accordance with an embodiment of the present disclosure is shown. A gas analysis unit 202 is arranged to receive extracted gas 204 through a ditch line 206 from a gas extraction unit 208. The gas extraction unit 208 is fluidly connected with a flow path of drilling mud used for performing downhole drilling operations.

As shown, a drilling rig 210 is arranged to drill a borehole 212 into a downhole formation 214. A mud pump 216 pumps drilling mud 218 in a mud line 220 into the borehole down a drill string 222, to and through a bit apparatus 224 (e.g., part of a BHA as described above), and then back up the borehole 212 through an annulus 226 of the borehole 212 (between a borehole wall and the drill string 222) to an exit line 228 which feeds into the gas extraction unit 208. The drilling mud 218 exits the gas extraction unit 208 and flows into a mud tank 230 from which the mud pump 216 pumps the mud in a mud line 232 back to the mud line 220.

The extracted gas 204 passing through the ditch line 206 is provided into the gas analysis unit 202 for analysis. The gas analysis unit 202 can be used to monitor gas levels of the drilling mud 218 and/or can monitor characteristics of the downhole formation 214 during drilling operations. As shown, located between the gas extraction unit 208 and the ditch line 206 is a condensation device 234. The condensation device 234 is arranged to cool the extracted gas prior to entering the ditch line 206 such that any liquids/moisture can be separated from the extracted gas, thus drying the gas prior to analysis within the gas analysis unit 202.

In accordance with some embodiments, the extracted gas is cooled using external, environmental (e.g., ambient) air prior to passing through the ditch line 206. Further, in accordance with some embodiments, condensation devices of the present disclosure are arranged to direct or channel any condensate back to the gas extraction unit 208. In some such embodiments, the condensate is returned to the gas extraction unit 208 by gravity, rather than requiring any type of pumping systems. Accordingly, through embodiments of the present disclosure, the temperature of the extracted gas 204 treated (e.g., passively) to approach ambient and/or environmental temperatures. With this pre-cooling, the condensation rate in the ditch line is reduced to a minimum, and thus desirable pressures can be maintained.

In accordance with some embodiments, the condensation device 234 is to be mounted above a liquid surface level of the drilling mud 218 within the gas extraction unit 208. This arrangement enables the condensate within the condensation device 234 to flow back into the gas extraction unit 208 by the force of gravity.

In accordance with one non-limiting example, a condensation device of the present disclosure includes an increased surface area that is exposed to ambient temperatures. For example, thermal transfer augmentation features, such as pins, fins, blades, etc. can be used to transport heat contained in the hot extracted drilling mud gas to the environment through the thermal transfer augmentation features. This operation enables the gas temperature to fall below a condensation temperature, and thus enables condensation to occur and drying the extracted gas 204 prior to entering the ditch line 206.

Figure 3A:
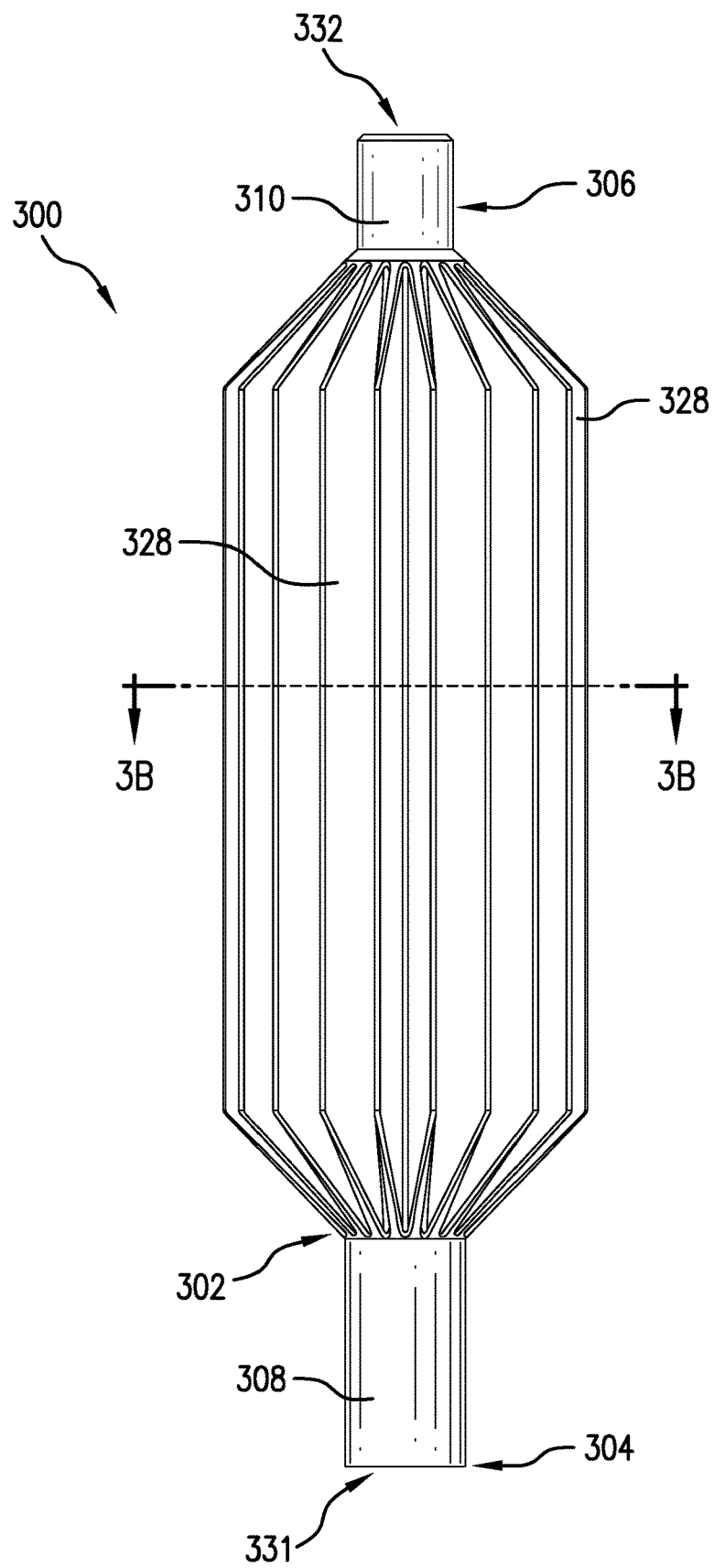
FIG. 3A is a schematic illustration of a condensation device in accordance with an embodiment of the present disclosure.
Figure 3B:
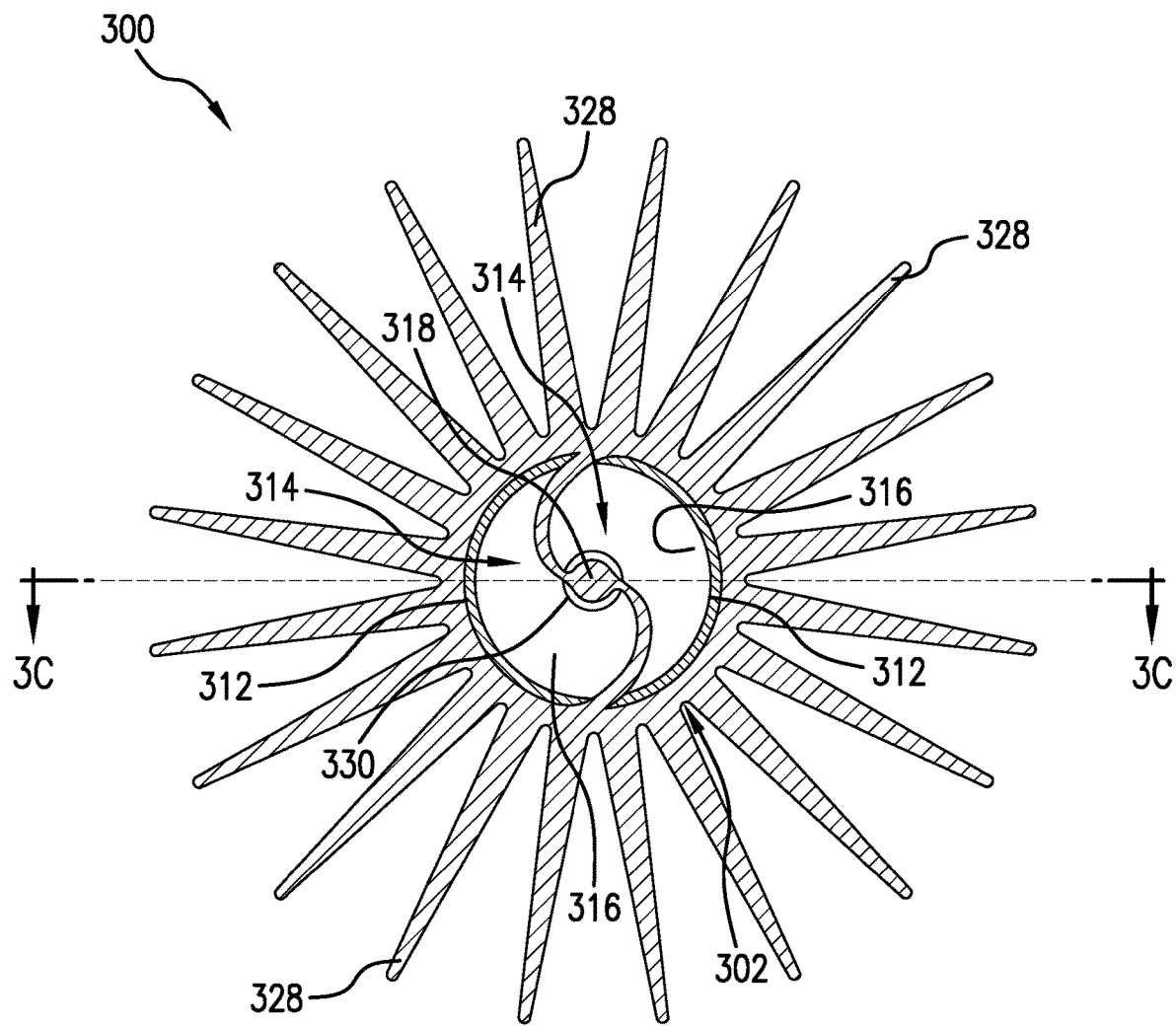
FIG. 3B is a schematic cross-sectional illustration of the condensation device of FIG. 3A as viewed along the line B-B shown in FIG. 3A.
Figure 3C:
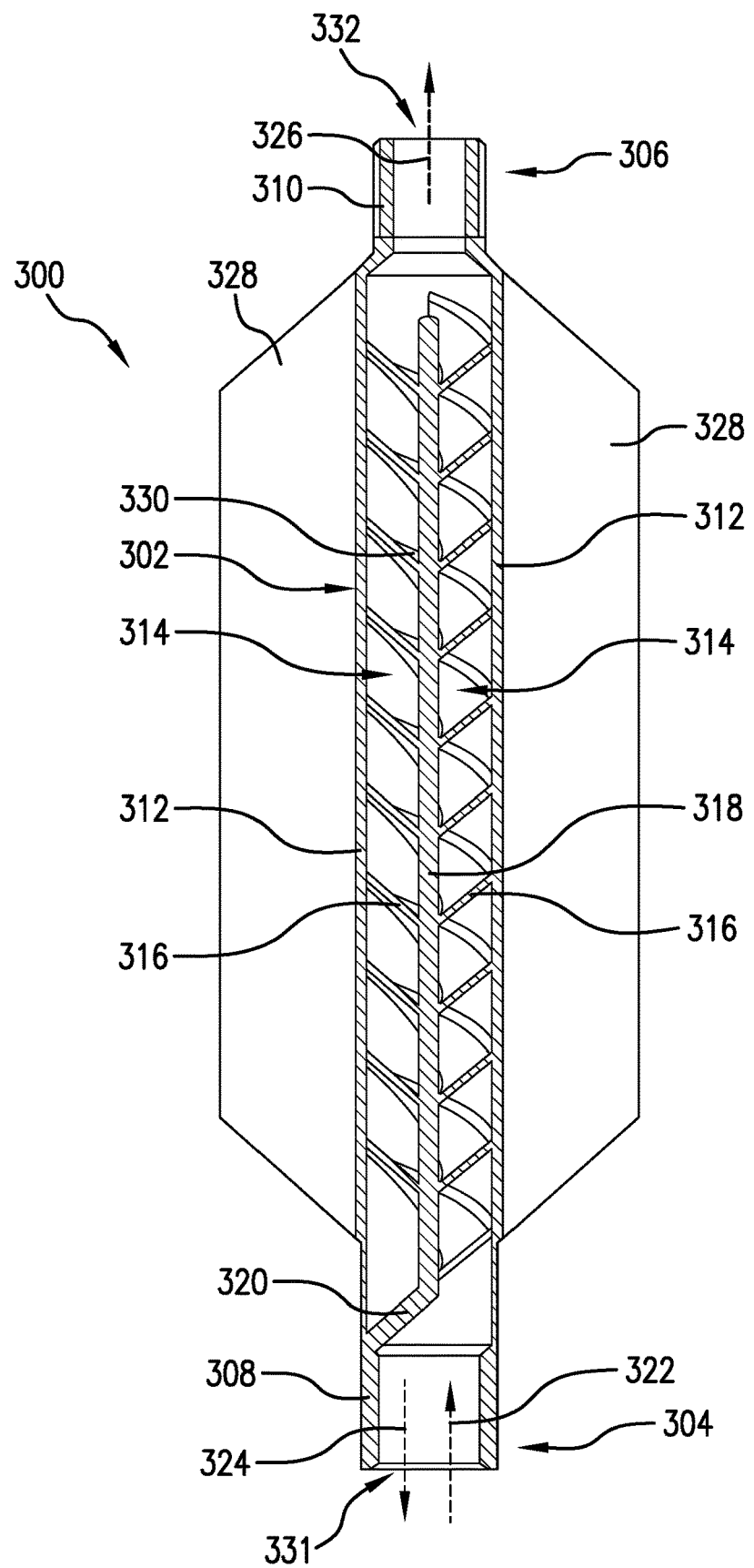
FIG. 3C is a schematic cross-sectional illustration of the condensation device of FIG. 3A as viewed along the line C-C shown in FIG. 3B.

Turning now to FIGS. 3A-3C, schematic illustrations of a condensation device 300 in accordance with an embodiment of the present disclosure are shown. The condensation device 300 is a device that is attachable to a fluid line that carries gases from a gas extraction unit to a gas analysis unit. In some embodiments, the condensation device 300 is attachable between a gas extraction unit and a ditch line, such as that shown and described with respect to FIG. 2. That is, the condensation device 300 can be used with downhole drilling systems, as shown and described herein.

The condensation device 300 is configured to cool extracted gas through thermal transfer or exchange with environmental air (e.g., atmospheric or ambient air) prior to the extracted gas passing through to the ditch line and into a gas analysis unit. Condensation device 300 may be made at least partially out of a material with good heat conductivity, such as, but not limited to, copper or aluminum. A preferred way to manufacture the condensation device 300 is by additive manufacturing, such as by direct laser melting, material jetting, binder jetting, powder bed fusion, direct energy depositing, vat photopolymerization, or material extrusion. Further, the condensation device 300 is arranged to direct condensate back into the gas extraction unit by gravity. The extract gas is converted to dry gas and the temperature of the dry gas is close to ambient temperatures. The pre-cooling provided by the condensation device 300 will thus reduce a condensation rate in the ditch line.

The condensation device 300 is mountable above a gas extraction unit and can be fluidly connected thereto during operation. For example, as shown, the condensation device 300 has a body 302 extending axially from a first end 304 to a second end 306. The first end 304 includes a first connector 308 and the second end 306 includes a second connector 310. The first connector 308 may comprise a first fluid connection 331 (e.g., a gas inlet) and is arranged to connect to an output of a gas extraction unit, and in some embodiments can be arranged as a threaded connection, although other means of connection are possible, including press-fit, interference fit, clamping, etc. Similarly, the second connector 310 may comprise a second fluid connection 332 (e.g., a gas outlet) and is arranged to connect to an input of a ditch line, and in some embodiments can be arranged as a threaded connection, although other means of connection are possible, including press-fit, interference fit, clamping, etc. The body 302 is a hollow body with an exterior wall 312 that defines an interior passage 314. The interior passage 314 provides a fluid connection or passage between a gas extraction unit (connected at the first end 304) and a ditch line or gas analysis unit (connected at the second end 306).

Within the body 302, the interior passage 314 is arranged, in this embodiment, as a helical passage or helical flow path that is defined by a support path 316. The support path 316 is a curved or helical surface or wall that extends from an inner support 318 to an interior surface of the exterior wall 312. The inner support 318, as shown, is connected to the exterior wall 312 proximate the first end 304 by a guide element 320 and is not connected to the exterior wall 312 at the second end 306. The lack of connection at the second end 306 can enable a largest possible volume for fluid to pass through without obstruction. The optional guide element 320 is arranged to direct and channel a fluid into and through the interior passage 314, such as in a helical manner by directing the fluid along the support path 316. The guide element 320 can also be used as a support structure for additive manufacturing of the inner support 318 and/or the helical support path 316.

In operation, an extracted gas 322 is fed into the interior passage 314 from a gas extraction unit that is connected to the first connector 308 at the first end 304. The extracted gas 322 is relatively hot and can include moisture that can adversely impact an analysis of gas that is representative of environmental conditions or aspects of downhole operations and/or drilling operations. As the extracted gas 322 flows through the interior passage 314, the extracted gas 322 is cooled to a condensation temperature of the moisture. As the moisture condenses out of the extracted gas 322 as a condensate 324, the extracted gas 322 is dried and a dried gas 326 is generated that flows through the second connector 310 at the second end 306 and into a ditch line and/or a gas analysis unit. The gas analysis unit will then be used to analyze the dried gas 326.

To aid in the cooling of the extracted gas 322 as it passes through the interior passage 314, the condensation device 300 includes one or more thermal transfer elements 328 formed on an exterior surface of the exterior wall 312. The thermal transfer elements 328 are arranged to increase a surface area of the condensation device 300 that is exposed to ambient or environmental air to thus maximize a thermal transfer between the extracted gas 322 and the material of the body 302 which will then transfer the thermal energy to the atmosphere through the thermal transfer elements 328. As shown, the thermal transfer elements 328 are arranged as fins or blades that extend from the exterior surface of the exterior wall 312 of the body 302. However, in other embodiments, the thermal transfer elements 328 can take any geometric shape or arrangement, including, but not limited to, pins or other increased surface area structures.

The thermal transfer elements 328 are in contact with the ambient environment (e.g., ambient air around the thermal transfer elements 328) that has a specific but undefined temperature or are in contact with a reservoir (not shown) that is pre-cooled to a predefined temperature. Pre-cooling can be done with any cooling system known in the art, including, but not limited to, thermoelectric cooling (e.g., by Peltier elements), evaporative cooling, liquid cooling (e.g., by contact with a flowing fluid or gas within a lower temperature utilizing a heat exchanger), compressor refrigerated, Vortex tubes, absorption refrigerator, magnetic cooling, Rankine cycle or any other technique that may utilize thermal radiation, heat conduction, or heat convection. The thermal transfer elements 328 will transfer heat from the hot extracted gas 322 to the ambient environment or the pre-cooled reservoir so that the gas temperature of the extracted gas 322 will fall below a condensation temperature and moisture within the extracted gas 322 will condense to separate the condensate 324 from the extracted gas 322.

The structure of the interior passage 314 includes a condensate trap 330. The condensate trap 330 is a groove or inclination that is arranged to guide the condensate 324 along the inner support 318 and direct the condensate 324 downward back to the first end 304. As such, the liquid of the condensate will flow away from the transfer elements 328 and downward in a direction toward the first end 304 on a path that is separated from the path of the gas and then drain back into the gas extraction unit that is connected to the first connector 308 at the first end 304. Guiding the condensate 324 away from the transfer elements 328 has advantages over conventional condensation devices as the condensate may reduce or prevent heat transfer through the transfer elements 328 if not properly removed.

Accordingly, the liquid form of the condensate 324 will flow by operation of gravity, and thus a passive condensation device performing a passive moisture removal process that does not need a power supply is provided. The passive condensation device 300 is cheaper to manufacture and easier to install compared to active condensation devices. A power supply, such as a generator, a capacitor, or a battery may also be a problem in areas exposed to explosion hazards, such as at the derrick and/or floor (e.g., derrick 11 and floor 12 shown in FIG. 1). Thus, in some aspects, embodiments disclosed herein also include a condensation device configured to operate in areas exposed to explosion hazards. In some embodiments, the first connector 308 is attached or connected to the gas extraction unit above a liquid surface level of the drilling mud from which the gas is extracted.

The arrangement of the condensation device 300 provides for the condensate 324 to be guided in the condensate trap 330. The condensate trap 330 can be, in some embodiments, compact in shape to thus provide a small area of condensate 324 that is exposed to the extracted gas 322 as the extracted gas 322 dries to generate the dried gas 326. Such arrangement can improve the drying efficiency of the condensation device 300. Such improvements in efficiency can be achieved because the condensate 324 is less disrupting the flow of the extracted gas 322 when the condensate 324 is guided in the condensate trap 330 which is at some distance from the exterior wall 312 where the extracted gas 322 is flowing. Further, the drying efficiency of the condensation device 300 is improved because by guiding the condensate 324 away from the heat transfer elements 328, an insulating film of the condensate 324 that can impact the thermal exchange through the transfer elements 328 can be reduced, minimized, or avoided.

As shown in FIGS. 3B-3C, and as noted above, the interior passage 314 is arranged in a helical shape to aid in extracting and separating moisture from the extracted gas 322. The condensation of the moisture from the extracted gas 322 and the channeling of the condensate 324 can be aided by an angling of the support path 316 as it forms the helical interior passage 314. As shown, the support path 316 is angled from the exterior wall 312 toward the inner support 318 in a direction toward the first end 304. This arrangement directs the fluid of the condensate 324 toward the center of the body 302 and removes it by operation of gravity from the edges or sides along the exterior wall 312 which can provide the most efficient thermal transfer between the extracted gas 322 and ambient or environmental air. As noted, the thermal transfer is aided by the thermal transfer elements 328 extending from the exterior surface of the exterior wall 312 which thus increase a surface area of the body 302 to maximize thermal transfer.

Advantageously, the condensation device 300 will separate the flow path of the condensate 324 from the flow of the extracted gas 322 as the extracted gas 322 dries and forms the dried gas 326. This arrangement can provide faster response times than prior separation solution as no bypass though that condensate channel/flow is required. Typically, such bypasses are used to decrease the reaction time on gas concentration changes in the gas line. Trapped gas volumes in the condensation path with poor connection to the gas line would pollute the actual gas that is transported from the gas extraction unit to the gas analysis unit through the ditch line. Accordingly, typically, the condensation line is required to be purged with a decent velocity. However, embodiments of the present disclosure remove such bypass lines and/or purging by providing passive moisture extraction, as described herein.

Figure 4A:
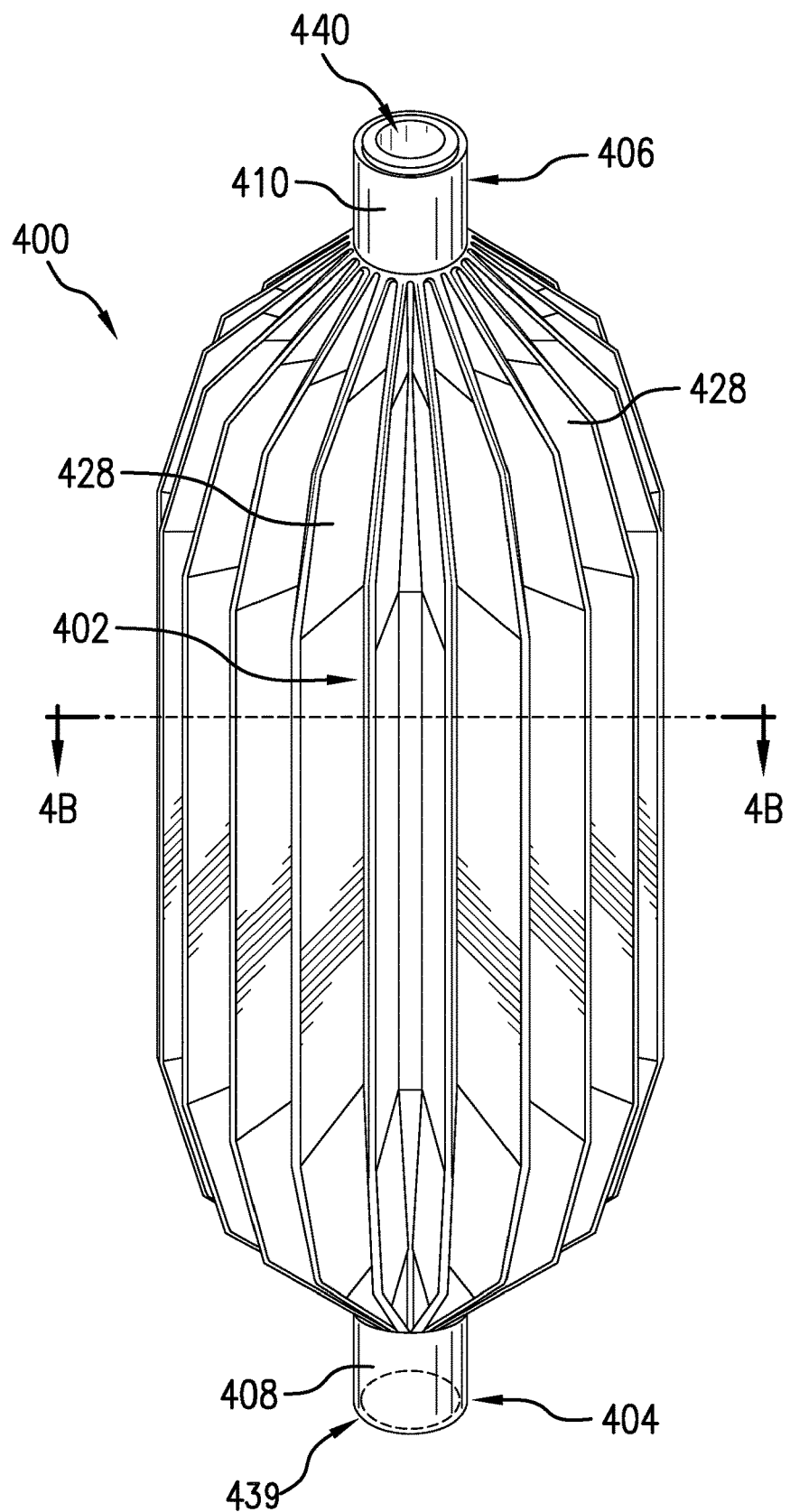
FIG. 4A is a schematic illustration of a condensation device in accordance with an embodiment of the present disclosure.
Figure 4B:
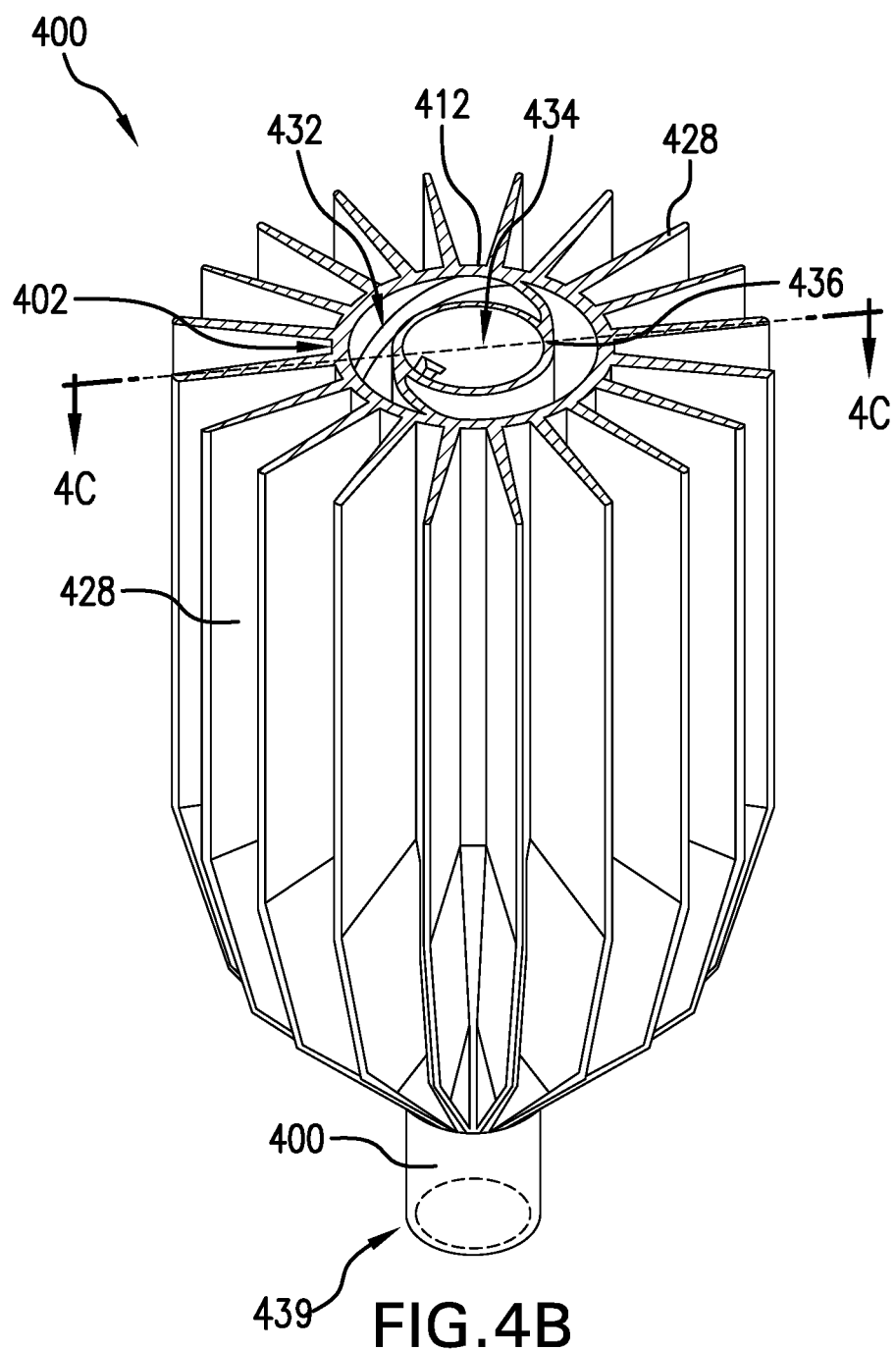
FIG. 4B is a schematic cross-sectional illustration of the condensation device of FIG. 4A as viewed along the line B-B shown in FIG. 4A.
Figure 4C:
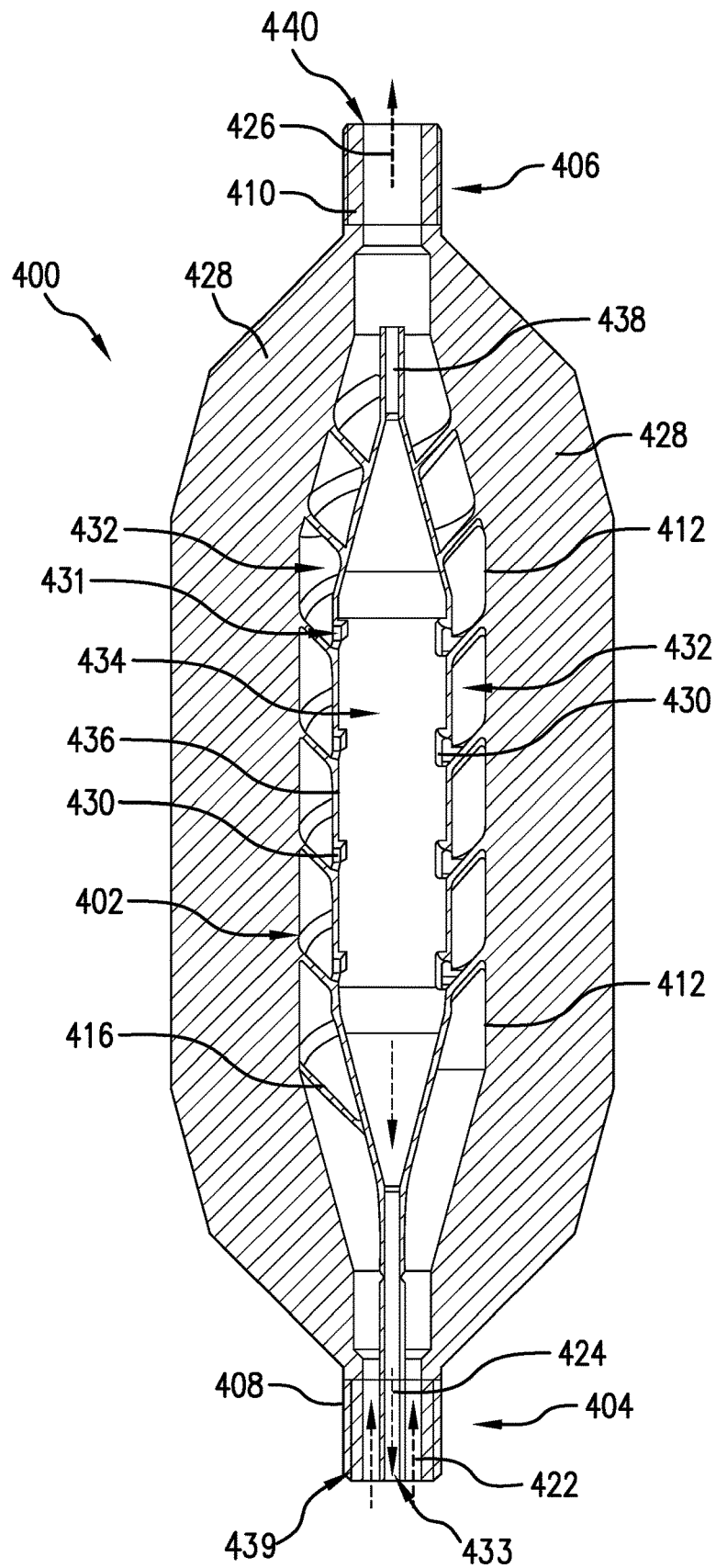
FIG. 4C is a schematic cross-sectional illustration of the condensation device of FIG. 4A as viewed along the line C-C shown in FIG. 4B.

Turning now to FIGS. 4A-4C, a condensation device 400 in accordance with another embodiment of the present disclosure is shown. The condensation device 400 is similar to the condensation device 300 shown and described with respect to FIGS. 3A-3C. The condensation device 400 is mountable above a gas extraction unit and is fluidly connected thereto in operation. The condensation device 400 has a body 402 extending axially from a first end 404 to a second end 406. The first end 404 includes a first connector 408 that may comprise a first fluid connection 439 (e.g., a gas inlet) and the second end 406 includes a second connector 410 that may comprise a second fluid connection 440 (e.g., a gas outlet). The first connector 408 is arranged to connect to an output of a gas extraction unit. The second connector 410 is arranged to connect to an input of a ditch line. The body 402 is a hollow body with an exterior wall 412 that defines an interior passage formed from a first interior passage 432 and a second interior passage 434 that are separated by an interior wall 436. The first and second interior passages 432, 434 provide a fluid connection or passage between a gas extraction unit (connected at the first end 404) and a ditch line or gas analysis unit (connected at the second end 406).

Within the body 402, the first interior passage 432 is arranged, in this embodiment, as a helical passage that is defined by a support path 416, similar to the arrangement shown in FIGS. 3A-3B. However, in this embodiment, the support path 416 is a curved (helical) wall or surface that extends from the interior wall 436 to an interior surface of the exterior wall 412. That is, the first interior passage 432 is a substantially annular or ring shape that surround the second interior passage 434. At the first end 404 the first interior passage 432 may be annular that flows into an annular helical orientation, with the second interior passage 434 being a cylinder that extends axially along a center of the body 402 and defined by the interior wall 436. That is, the first interior passage 432 may be arranged as an annular passage that surrounds the second interior passage 434.

In operation, an extracted gas 422 is fed into the first interior passage 432 from a gas extraction unit that is connected to the first connector 408 at the first end 404. The extracted gas 422 is relatively hot and can include moisture that is extracted from the extracted gas 422 as the extracted gas 422 flows upward through the first interior passage 432. As the extracted gas 422 flows through the first interior passage 432, the extracted gas 422 is cooled to a condensation temperature of the moisture within the extracted gas 422. As the moisture condenses out of the extracted gas 422 as a condensate 424, the extracted gas 422 is dried and a dried gas 426 is generated that flows through the second connector 410 at the second end 406 and into a ditch line and/or a gas analysis unit. The gas analysis unit will then be used to analyze the dried gas 426.

Similar to the arrangement described above, the condensation device 400 includes one or more thermal transfer elements 428 formed on an exterior surface of the exterior wall 412, and operate in a substantially similar manner as that described above. The thermal transfer elements 428 will transfer heat from the hot extracted gas 422 flowing through the first interior passage 432 causing moisture to condense out of the extracted gas 422. In this embodiments, the first interior passage 432 includes a condensate trap 430 formed as a groove or inclination along the interior wall 436. The condensate trap 430 can further include one or more apertures 431 arranged to direct the condensate 424 downward and into the second interior passage 434.

In an alternative embodiment, the condensate trap may comprise one or more condensate barriers (not shown) in the support path 416. The condensate barrier may be another guiding structure that guides the condensate as the condensate flows along the support path 416 to the second interior passage 434 and toward the first end 404 of the condensation device. The condensate barrier, in some embodiments, may extend at least partially from the interior wall 436 to the interior surface of the exterior wall 412. In some such embodiments, a height of the condensate barrier extends at least partially along the axis of the condensation device 400, also referred to as longitudinal axis of the condensation device (extending from the first end 404 to the second end 406 of the body 402). The height of the condensate barrier can be sized to allow the gas flow in the first interior passage 432 to pass through the first interior passage 432. The height of the condensation barrier may be between 0.1% and 5% of the height of the first interior passage 432 in the direction of the longitudinal axis of the condensation device, or may be between 5% and 10%, or may be between 10% and 15%, or may be between 15% and 20%, or may be between 20% and 30%, or may be between 30% and 50%, or may be between 50% and 90% of the height of the first interior passage in the direction of the longitudinal axis of the condensation device. The condensation barrier may form a continuous barrier from the interior wall 436 to the interior surface or may have one or more gaps. The height of the condensate barrier may vary along the extent of the condensation barrier from the interior wall 436 toward the interior surface. In some embodiments, the condensation device can include multiple condensation barriers, and in some such embodiments, a height of a first condensation barrier may be different than a height of a second condensation barrier. Alternatively still, in some embodiments, the condensation barrier may be formed as a step in the support path 416. The step extending at least partially from the interior wall 436 towards the interior surface.

The apertures 431 and/or an outlet 433 of the second interior passage 434 may be sized such that the most part of the gas flow is going through the first interior passage 432. For example, the second interior passage 434 and/or the apertures 431 may be sized to keep some of the condensate 424 within the second interior passage 434 in order to prevent dried gas 426 and/or extracted gas 422 from escaping condensation device 400 through the outlet 433 at the bottom (e.g., first end 404) of condensation device 400. The apertures 431 and/or other outlets of the interior passage 434 may be sized by one or more valves (not shown) that may be adjustable and operated manually or automatically. For example, if the flow of condensate is high through the outlet 433 at the first end 404 of condensation device 400, a valve in the outlet 433 at the first end 404 of condensation device 400 may be manually or automatically adjusted to a more closed position to keep some of the condensate 424 within the second interior passage 434 in order to prevent dried gas 426 and/or extracted gas 422 from escaping condensation device 400 through the outlet 433 at the first end 404 of condensation device 400. Automatic adjustment of the one or more valves may be performed by means of a controller (not shown) that is configured to receive instructions to operate the one or more valves. The controller may receive data from a sensor (not shown) that are indicative of the amount of condensate 424 that is present within second interior passage 434 (e.g. pressure data, fluid level data or similar) based on which the controller controls the one or more valves.

In operation, the condensate 424 will flow back to the first end 404. As such, the liquid of the condensate 424 will flow downward in a direction toward the first end 404 and then drain back into the gas extraction unit that is connected to the first connector 408 at the first end 404. For example, the condensate 424 may flow through the outlet 433 at the first end 404 of the condensation device 400.

In this embodiment, any gas that subsequently separates from the condensate 424 and/or flows directly into the second interior passage 434 from the gas extraction unit can flow directly through to the ditch line at the second end 406 through an optional gas bypass 438. The gas bypass 438 is located proximate the second end 406 and enables fluid (e.g., gas) passage from the second interior passage 434 into the second connector 410 and into a ditch line or gas analysis unit connected thereto. That is, the gas bypass 438 can provide an exit for gas within the second interior passage 434 to flow toward the second end 406. The gas bypass 438 can decrease a reaction time on gas concentration changes in the ditch line. For example, trapped gas volumes in the condensation path (e.g., within the second interior passage 434) with poor connection to the ditch line could pollute the extracted gas 422 that is dried to form the dried gas 426 that is transported from the gas extraction unit to the gas analysis unit.

Similar to the embodiment described above, the liquid form of the condensate 424 will flow by operation of gravity, and thus a passive moisture removal process is provided by the condensation device 400. In this embodiment, the path for the condensed liquid is separate from the extracted/dry gas path. In this manner, the efficiency of the condensation device 400 can be improved. This is because, in this arrangement, the condensate 424 is less disrupting of a flow of the extracted gas 422 and any condensate film that may form an insulation layer is reduced to a minimum.

Although specific geometric and/or structural orientations are shown and described herein, those of skill in the art will appreciate that alternative arrangements may be employed without departing from the scope of the present disclosure. For example, in some embodiments, the helical structure could be altered into a maze-like fashion, or, in some embodiments, the helical support path may extend outward from the inner support/interior wall but not contact the exterior wall.

While embodiments described herein have been described with reference to specific figures, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed, but that the present disclosure will include all embodiments falling within the scope of the appended claims or the following description of possible embodiments.

Embodiment 1

A condensation device for gas extracted from drilling fluids while drilling, the condensation device comprising: a body having a first end and a second end and an exterior wall defining an interior surface; an interior passage providing a connection from the first end to the second end; and an angled support path within the interior passage, the angled support path extending from the interior surface and angled with respect to gravity, wherein the angled support path is configured to direct a condensate away from the interior surface by the operation of gravity.

Embodiment 2

The condensation device of any of the above embodiments, wherein the angled support path extends through the body substantially from the first end to the second end.

Embodiment 3

The condensation device of any of the above embodiments, wherein the first and the second end of the body enable fluid connection.

Embodiment 4

The condensation device of any of the above embodiments, wherein the angled support path defines a helical flow path through the body.

Embodiment 5

The condensation device of any of the above embodiments, wherein at least a part of the condensation device is manufactured by additive manufacturing.

Embodiment 6

The condensation device of any of the above embodiments, further comprising an inner support, the inner support having an interior wall dividing the interior passage into a first interior passage and a second interior passage.

Embodiment 7

The condensation device of any of the above embodiments, wherein the first interior passage is a passage that surrounds the second interior passage.

Embodiment 8

The condensation device of any of the above embodiments, wherein the first interior passage is at least partially defined by the angled support path.

Embodiment 9

The condensation device of any of the above embodiments, wherein the angled support path defines a helical surface that extends from the interior surface of the exterior wall.

Embodiment 10

The condensation device of any of the above embodiments, further comprising one or more apertures formed within the interior wall to direct the condensate into the second interior passage.

Embodiment 11

The condensation device of any of the above embodiments, further comprising a gas bypass located proximate the second end configured to provide an exit for gas within the second interior passage.

Embodiment 12

The condensation device of any of the above embodiments, further comprising a condensation trap formed by the angled support path, the condensation trap configured to direct the condensate toward the first end.

Embodiment 13

The condensation device of any of the above embodiments, further comprising at least one thermal transfer element extending from an exterior surface of the exterior wall.

Embodiment 14

A moisture separation system to separate moisture from gas extracted from a drilling fluid while drilling, the moisture separation system comprising: a gas extraction unit arranged to receive drilling fluid; and a condensation device fluidly connected to the gas extraction unit, the condensation device comprising: a body having a first end and a second end and an exterior wall defining an interior surface; a first connector at the first end arranged to fluidly connect to the gas extraction unit; a second connector at the second end arranged to fluidly connect to a gas analysis unit; an interior passage providing a connection from the first end to the second end; and an angled support path located within the interior passage, the angled support path extending from the interior surface and angled with respect to gravity; wherein the angled support path is configured to direct a condensate away from the interior surface by the operation of gravity.

Embodiment 15

The moisture separation system of any of the above embodiments, wherein the inner support includes an interior wall dividing the interior passage into a first interior passage and a second interior passage.

Embodiment 16

The moisture separation system of any of the above embodiments, further comprising one or more apertures formed within the interior wall to direct the condensate into the second interior passage.

Embodiment 17

The moisture separation system of any of the above embodiments, further comprising a condensation trap formed by the angled support path, the condensation trap configured to direct the condensate toward the first end.

Embodiment 18

The moisture separation system of any of the above embodiments, wherein the condensation device is mounted above the gas extraction unit.

Embodiment 19

The moisture separation system of any of the above embodiments, wherein at least a part of the condensation device is manufactured by additive manufacturing.

Embodiment 20

The moisture separation system of any of the above embodiments, wherein the support path defines a helical flow path through the body.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While embodiments described herein have been described with reference to various embodiments, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed as the best mode contemplated for carrying the described features, but that the present disclosure will include all embodiments falling within the scope of the appended claims.

Accordingly, embodiments of the present disclosure are not to be seen as limited by the foregoing description, but are only limited by the scope of the appended claims.

What is claimed is:

1. A condensation device for gas extracted from drilling fluids while drilling, the condensation device comprising:
   a body having a first end and a second end and an exterior wall having an interior surface and an exterior surface;
   an interior passage providing a connection from the first end to the second end; and
   an angled support path within the interior passage, the angled support path extending from the interior surface and angled with respect to gravity;
   an inner support, the inner support having an interior wall dividing the interior passage into a first interior passage and a second interior passage; and
   a gas bypass located proximate the second end configured to provide an exit for gas within the second interior passage,
   wherein the angled support path is configured to direct a condensate away from the interior surface by the operation of gravity.

2. The condensation device of claim 1, wherein the angled support path extends through the body substantially from the first end to the second end.

3. The condensation device of claim 1, wherein the first end and the second end of the body are configured for fluid connection.

4. The condensation device of claim 1, wherein the angled support path defines a helical flow path through the body.

5. The condensation device of claim 1, wherein at least a part of the condensation device is manufactured by additive manufacturing.

6. The condensation device of claim 1, wherein the first interior passage is a passage that surrounds the second interior passage.

7. The condensation device of claim 1, wherein the first interior passage is at least partially defined by the angled support path.

8. The condensation device of claim 7, wherein the angled support path defines a helical surface that extends from the interior surface of the exterior wall.

9. The condensation device of claim 1, further comprising one or more apertures formed within the interior wall to direct the condensate into the second interior passage.

10. The condensation device of claim 1, further comprising a condensate trap formed by the angled support path, the condensate trap configured to direct the condensate toward the first end.

11. The condensation device of claim 1, further comprising an increased surface area structure comprising at least one of a pin, a fin, and a blade extending outward from an exterior surface of the body.

12. The condensation device of claim 1, further comprising a condensate barrier arranged on the angled support path and configured to direct condensate along the support path to the second interior passage and toward the first end.

13. The condensation device of claim 12, wherein the condensate barrier extends from the interior wall of the inner support structure to the interior surface of the exterior wall.

14. The condensation device of claim 12, wherein the condensate barrier has a height extending from the angled support path that is 90% or less than a height of the interior passage.

15. A moisture separation system to separate moisture from gas extracted from a drilling fluid while drilling, the moisture separation system comprising:
   a gas extraction unit arranged to receive drilling fluid; and
   a condensation device fluidly connected to the gas extraction unit, the condensation device comprising:
   a body having a first end and a second end and an exterior wall having an interior surface and an exterior surface;
   a first connector at the first end arranged to fluidly connect to the gas extraction unit;
   a second connector at the second end arranged to fluidly connect to a gas analysis unit;
   an interior passage providing a connection from the first end to the second end;
   an angled support path located within the interior passage, the angled support path extending from the interior surface and angled with respect to gravity;
   an inner support, the inner support having an interior wall dividing the interior passage into a first interior passage and a second interior passage; and
   a gas bypass located proximate the second end configured to provide an exit for gas within the second interior passage,
   wherein the angled support path is configured to direct a condensate away from the interior surface by the operation of gravity.

16. The moisture separation system of claim 15, further comprising one or more apertures formed within the interior wall to direct the condensate into the second interior passage.

17. The moisture separation system of claim 15, further comprising a condensate trap formed by the angled support path, the condensate trap configured to direct the condensate toward the first end.

18. The moisture separation system of claim 15, wherein the condensation device is mounted above the gas extraction unit.

19. The moisture separation system of claim 15, wherein at least a part of the condensation device is manufactured by additive manufacturing.

20. The moisture separation system of claim 15, wherein the support path defines a helical flow path through the body.

21. A condensation device for gas extracted from drilling fluids while drilling, the condensation device comprising:
   a body having a first end and a second end and an exterior wall having an interior surface and an exterior surface;
   an interior passage providing a connection from the first end to the second end; and
   an angled support path within the interior passage, the angled support path defining a helical flow path and extending from the interior surface to an inner support and angled toward the inner support with respect to gravity;
   a helical condensate trap arranged along the inner support and the angled support path; and
   a condensate barrier arranged on the angled support path and configured to direct condensate toward the first end,
   wherein the angled support path is configured to direct a condensate away from the interior surface into the helical condensate trap and along the helical flow path in a direction toward the first end by the operation of gravity.

* * * * *